United States Patent Office 3,479,369
Patented Nov. 18, 1969

3,479,369
ALKYL- OR ARYL-4-ANTIPYRYLMONOSULFIDES
AND METHOD FOR PREPARING SAME
Zaven S. Ariyan, Woodbury, Conn., assignor to Uniroyal,
Inc., New York, N.Y., a corporation of New Jersey
No Drawing. Filed Apr. 5, 1967, Ser. No. 628,545
Int. Cl. C07d 49/04
U.S. Cl. 260—310                    13 Claims

ABSTRACT OF THE DISCLOSURE

This invention relates to a fungicidal composition of alkyl- or aryl-4-antipyrylmonosulfides, and the method of preparing same by reacting a sulfenyl halide with antipyrine.

This invention relates to a new class of chemical compounds known as vinyl mixed sulfides which are represented by the general formula:

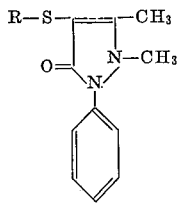

where R is an aryl, lower alkyl substituted aryl, halo substituted aryl, nitro substituted aryl, halo-nitro substituted aryl, amino substituted aryl, lower alkyl, and halo substituted lower alkyl group.

This invention also relates to a process for the preparation of the above-mentioned new vinyl mixed sulfide compounds by the reaction of a sulfenyl halide with 1-phenyl-2,3-dimethyl-3-pyragolin-5-one (antipyrine).

Sulfenyl halides are characterized by the general formula R—S—X, where X is a halogen such as chlorine, bromine or iodine, and R is a substituted or unsubstituted alkyl or aryl hydrocarbon group. The preferred type of sulfenyl halide to be used when practising the present invention is one which contains an aryl moiety such as phenyl-, naphthyl-, pentachlorophenyl-, pentamethylphenyl-, ortho-nitrophenyl-, 4-bromo-2-nitrophenyl-, 4-chloro-2-nitrophenyl-, 2,4-dinitrophenyl-, 2,4,6-trimethylphenyl-, tert-butylphenyl-, 4-methyl-2-nitrophenyl and other related substituted aryl groups. The lower alkyl groups which may be susbtituted on the aryl group generally contain from 1 to 4 carbon atoms. Usually, not more than 3 lower alkyl groups, or 2 nitro or 2 amino groups are substituted on the aryl group. However other combinations different of substituent groups such as halonitro substituted aryl groups etc. can be used. The invention is not limited to vinyl mixed sulfide compounds made from sulfenyl halides containing aryl groups since sulfenyl halides containing halo- substituted lower alkyl groups or unsubstituted lower alkyl groups can be used. These lower alkyl groups typically contain from 1 to 5 carbon atoms and are exemplified by methyl, ethyl, n-propyl, isopropyl, trichloromethyl, dichloroethyl, trichloroethyl, dichloropropyl, dibromoethyl, dibromopropyl groups.

The vinyl mixed sulfides, which are the products of the reaction of the various sulfenyl halides noted above and antipyrine are generically named either alkyl-4-antipyryl-monosulfides or aryl-4-antipyrylmonosulfides depending upon which type of hydrocarbon group is present in the sulfenyl halide.

These vinyl mixed sulfide compounds have been found to be effective protective fungicides in the control of alternaria solani (tomato blight). In addition they show bactericidal activity in the control of Staphylococcus aureus. They can be used also as pharmaceutical intermediates.

In the process of this invention, the reaction of antipyrine and a sulfenyl halide has a reactant molar ratio of 1 to .75 respectively and said reaction is carried out in the presence of a polar solvent such as ethylene dichloride, carbon disulfide, acetonitrile, chloroform, or dry acetic acid. It is preferred, but not necessary, to use ethylene dichloride as a solvent when reacting as sulfenyl halide containing an aryl moiety with anti pyrine because the reaction which occurs is slightly exothermic and the resulting initially formed vinyl mixed sulfide product containing the aryl group precipitates out almost immediately in this solvent.

When reacting an alkyl sulfenyl halide with antipyrine, it is preferred, to use carbon disulfide as the solvent although other solvents can also be used effectively. The reaction and formation of a precipitate in the reaction of the alkyl sulfenyl halide with antipyrine is very slow and thus a catalyst, such as anhydrous aluminum chloride or other similar compounds, may be added to the reactants in the solvent in order to initiate the exothermic reaction more quickly. Once the exothermic reaction has started in a solvent such as carbon disulfide, some of the alkyl vinyl mixed sulfide reaction product precipitates out almost immediately. When reacting an aryl or alkyl sulfenyl halide with antipyrine it is preferred to use ethylene chloride or carbon disulfide respectively as solvents, as noted above, since the vinyl mixed sulfide reaction product is insoluble in these solvents and therefore can be isolated from solution easily. Certain of the vinyl mixed sulfides are soluble in solvents such as ethylene dichloride so that the presence of the vinyl mixed sulfide reaction product in an ethylene dichloride solution is not readily detected. Even though the reaction product is soluble in the solvent used, all steps of the process described herein are essentially the same with the exception of the last step of isolating the vinyl mixed sulfide product.

Since the reaction of a sulfenyl halide with antipyrine is slightly exothermic, it is preferred that the temperature of the reaction solution be kept between room temperature and 10° C. by cooling the reaction vessel at least during the initial formation of the vinyl mixed sulfide product. The cooling of the solution is maintained only as long as the initial reaction product is forming i.e. for about 1–30 minutes. When the temperature of the solution begins to steadily decrease the initial vinyl mixed sulfide reaction product is formed and the reaction vessel may be removed from the cooling bath.

The solvent in which the vinyl mixed sulfide precipitate is present, also contains a dissolved intermediate, known as a "saturated halo derivative," which is a further source of vinyl mixed sulfide. This solution which contains both the vinyl mixed sulfide product and intermediate product is refluxed to drive off hydrogen halide gas from the dissolved intermediate adduct thus forming additional vinyl mixed sulfide in the solution which may or may not be in a precipitate form depending upon the solvent used.

When it appears that no further hydrogen halide gas is formed, the vinyl mixed sulfide formation is complete and refluxing is ceased. The mixture can be refluxed for a period of from 20 to 60 minutes, and generally the refluxing time necessary to effect the maximum formation of the vinyl mixed sulfide product in solution is from about 35 to 60 minutes at the boiling temperature of the solvent. The vinyl mixed sulfides in precipitate form are then recovered from the solution by filtration, or any other suitable means, purified if desired, and dried. The vinyl mixed sulfide products which are soluble in the solvent are obtained by evaporating off the solvent and collecting the reaction product residue. The vinyl mixed sulfide products which are obtained by either of the above noted recovery methods are well defined crystalline products having definite melting points.

As noted above, during the course of the sulfenyl halide-antipyrine reaction in solution, intermediate adducts are formed which are called "saturated halo derivatives." If desired, these intermediate adducts may be isolated by a variation of the methods disclosed previously. When the reaction product is insoluble in the solvent this is accomplished by removing the initially formed vinyl mixed sulfide precipitate after the reactants are mixed, by suitable filtration means and then, instead of refluxing the remaining filtrate as described previously, the filtrate is evaporated without the application of heat under reduced pressure to obtain the crystalline intermediate adduct.

If the vinyl mixed sulfide product is soluble in the solvent, after the reactants are mixed, the solvent is evaporated without the application of heat and the vinyl mixed sulfide product is separated from the intermediate adduct present in the residue by placing the residue in some solvent in which the intermediate adduct is soluble but in which the vinyl mixed sulfide product is not soluble. The dissolved intermediate adduct is then easily separated from the vinyl mixed sulfide product. The solvent containing the dissolved intermediate adduct is evaporated to dryness in the absence of heat and under reduced pressure to obtain the intermediate adduct residue. The intermediate adduct is the result of the union of one mole of sulfenyl halide with one mole of antipyrine. The adduct exists as a fuming product which is somewhat unstable and decomposes by losing hydrogen halide gas to the atmosphere to yield a stable vinyl mixed sulfide product. Although the intermediate adducts are somewhat unstable in the atmosphere, they are relatively stable when stored in an inert atmosphere such as nitrogen or carbon dioxide. The "saturated halo derivatives" are also useful as protective fungicides, pharmaceutical intermediates and show bactericidal activity. The general formula for these intermediate adducts is:

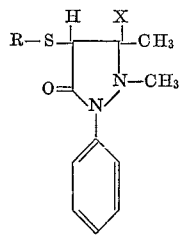

where R is an aryl, lower alkyl substituted aryl, halo substituted aryl, nitro substituted aryl, halo- nitro substituted aryl, amino substituted aryl, lower alkyl, and halo substituted lower alkyl group. Typical examples of the sulfenyl halides which can be used to prepare these intermediate adducts are ortho-nitro-benzenesulfenyl chloride, methanesulfenyl chloride or trichloromethanesulfenyl chloride, tribromomethanesulfenyl chloride.

The method of the present invention cannot be used to react a sulfenyl halide which contains an amino or di-amino substituted aryl group since these compounds have not been prepared. This anomaly, which applies to amino substituted aryl sulfenyl halides only, requires that some other method be used to obtain amino substituted vinyl mixed sulfide compounds.

It has been discovered that when the product of a sulfenyl halide and antipyrine reaction contains one or more nitro ($NO_2$) groups, particularly nitro groups in the ortho position to the sulfur atom, these nitro groups may be reduced readily to amino groups under controlled hydrogenation conditions without affecting the rest of the compound. A method which can be used to selectively hydrogenate the nitro groups present in a vinyl mixed sulfide compounds is disclosed in U.S. Patent 3,336,386 issued Aug. 15, 1967. Thus, by hydrogenating a vinyl mixed sulfide compound containing nitro groups in the presence of a platinum sulfide catalyst supported on a carbon base, in a polar solvent such as acetonitrile at a temperature of 125°–130° C. and a pressure of 520–650 p.s.i.g., a nearly quantitive yield of the corresponding amino-derivative is produced. The hydrogen gas absorption in this reaction ranges from 85 to 97.5% of the theoretical.

This reaction is shown as follows:

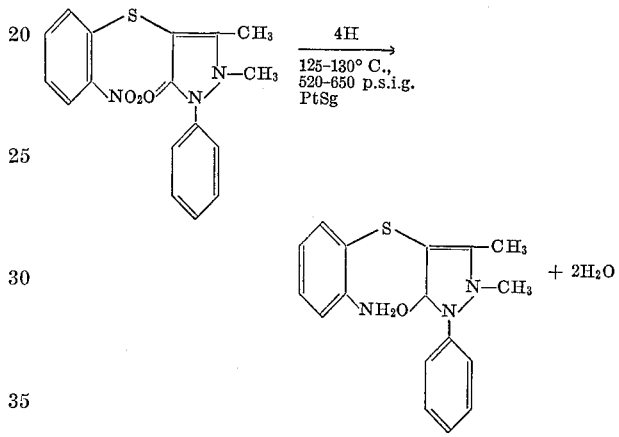

This invention will be more fully described in the following examples which are illustrative of the way in which the invention is carried out.

EXAMPLE 1

This example details a method of preparation of pentachlorophenyl-4-antipyrylmonosulfide using pentachlorobenzenesulfenyl chloride and antipyrine.

37.6 grams (0.2 mole) of antipyrine are dissolved in 100 cc. of dry ethylene chloride. To this solution is added a well stirred solution of 37.2 grams (0.15 mole) of pentachlorobenzenesulfenyl chloride dissolved in 200 cc. of ethylene chloride. Due to the exothermic nature of the ensuing reaction, the reaction mixture is cooled by a water ice bath to a temperature in the range of 0° to 10° C. during the addition of the pentachlorobenzenesulfenyl chloride to the antipyrine. Upon addition of the pentachlorobenzenesulfenyl chloride to the antipyrine, the orange color of the pentachlorobenzenesulfenyl chloride solution disappears and a precipitate appears. The mixture is refluxed for 45 minutes at a temperature between 70 and 80° C. in order to drive off hydrogen chloride gas and form additional precipitate. After the hydrogen chloride gas is expelled, the solution is allowed to cool, and, upon cooling, a white precipitate, which has a crude melting point of 240° C., is isolated from the solution and dried. The precipitate is then dissolved and recrystallized from a carbon tetrachloride-chloroform mixture to give the pure vinyl mixed sulfide product having a melting point of 242°–243° C., the yield of this pure adduct being 73% of theoretical.

Table I lists the above and other similar type compounds prepared by the reaction of the appropriate sulfenyl halides with antipyrine according to the same procedure as presented in this example, and characterizes them analytically. In certain cases after addition of the sulfenyl halide to antipyrine and refluxing and cooling, the precipitate does not form. In such cases, the final reaction product is obtained by evaporation of the solvent.

Table I

General formula of the aromatic compound obtained using the method of the present invention:

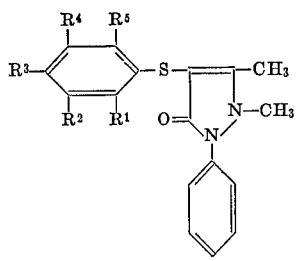

where $R^1$ through $R^5$ are hydrogen, alkyl groups containing from 1 to 4 carbon atoms, halogen, at least one and not more than two nitro groups, amino groups or mixtures thereof.

| Formula | $R^1$ | $R^2$ | $R^3$ | $R^4$ | $R^5$ | Melting point, °C. | Theoretical N | Theoretical S | Theoretical Cl | Analyzed N | Analyzed S | Analyzed Cl | Yields (percent of Theoretical) |
|---|---|---|---|---|---|---|---|---|---|---|---|---|---|
| 1 $C_{17}H_{15}N_3O_3S$ | $NO_2$ | H | H | H | H | 219–220 | 12.31 | 9.39 | | 12.57 | 9.35 | | 89 |
| 2 $C_{17}H_{14}ClN_3O_3S$ | $NO_2$ | H | Cl | H | H | 190–191 | 11.19 | 8.54 | 9.45 | 11.39 | 8.32 | 9.15 | 79 |
| 3 $C_{17}H_{14}N_4O_5S$ | $NO_2$ | H | $NO_2$ | H | H | 211–212 | 14.50 | 8.30 | | 13.72 | 9.77 | | 87 |
| 4 $C_{20}H_{22}N_2OS$ | $CH_3$ | H | $CH_3$ | H | $CH_3$ | 151 | 8.28 | 9.47 | | 8.06 | 9.54 | | 63 |
| 5 $C_{17}H_{11}Cl_5N_2OS$ | Cl | Cl | Cl | Cl | Cl | 242–243 | 5.98 | 6.84 | 37.84 | 5.81 | 6.37 | 37.79 | 72 |

EXAMPLE 2

This example details a method of preparation of trichloromethyl-4-antipyrylmonosulfide using trichloromethanesulfenyl chloride and antipyrine. 37.6 grams (0.2 mole) of antipyrine are dissolved in 100 cc. of dry carbon disulfide. To this solution are added 37 grams (0.2 mole) of trichloromethanesulfenyl chloride disolved in 100 cc. of dry carbon disulfide. In addition, 1 gram of anhydrous aluminum chloride catalyst is added to initiate the reaction. Upon mixing the reactants, some trichloromethyl-4-antipyrylmonosulfide precipitate is formed initially, and the solution is refluxed for about 35 minutes until no more hydrogen chloride is evolved. The precipitate formed is separated by filtration and turns a pale yellow color upon cooling. The precipitate is washed with water and a small amount of alcohol and dried. The melting point of this product is 163°–165° C. The yield of this product is 63% of the theoretical. $C_{12}H_{11}N_2OSCl_3$ requires N=8.3%; analyzed N=9.1%.

EXAMPLE 3

This example details a method of preparing isopropyl-4-antipyrylmonosulfide using isopropanesulfenyl chloride and antipyrine.

37.6 grams (0.2 mole) of antipyrine are dissolved in 100 cc. of dry carbon disulfide. To this is added a solution of 24.4 gr. (0.2 mole) of ispropanesulfenyl chloride in 100 cc. of carbon disulfide. One gram of anhydrous aluminum chloride catalyst is added to this mixture, which is refluxed for about 40 minutes. After refluxing, the mixture is cooled to room temperature and the solvent is evaporated under a vacuum. A gold colored oil is obtained which decomposes if distillation is attempted. The oil is purified by washing with water to yield a product which analyzed favorably for the desired product.

$C_{14}H_{18}OSN_2$ requires N=11.3, analyzed N=12.1.

EXAMPLE 4

This example details the preparation of the "saturated chloro-adduct" of 4-chloro-2-nitrobenzenesulfenyl chloride and antipyrine.

37.6 grams (0.2 mole) of antipyrine are dissolved in 100 cc. of ethylene chloride. To this solution are added 34.6 grams (0.15 mole) of 4-chloro-2-nitrobenzenesulfenyl chloride dissolved in 200 cc. of ethylene chloride. After the sulfenyl chloride solution is added to the antipyrine solution, a vinyl mixed sulfide precipitate appears. The solution is then filtered to remove said vinyl mixed sulfide precipitate from the solution. The filtrate is then evaporated to dryness without the application of heat under reduced pressure. The "saturated chloro-adduct" obtained from the filtration and the evaporation steps is a fuming crystalline material having a melting point of 135–145° C. (with decomposition). Since this material readily decomposes with the loss of hydrogen chloride, it is kept in a well sealed container in a nitrogen atmosphere, and can be stored without decomposition for some weeks. The analytical data for the product obtained in Example 4 are as follows:

Formula: $C_{17}H_{15}N_3O_3SCl_2$; Melting point: 135–145° C. (dec.); Theoretical: N, 10.20; S, 7.78; Cl, 17.20; Analyzed: N, 10.32; S, 7.34; Cl, 17.85.

EXAMPLE 5

This example presents the preparation of orthoaminophenyl-4-antipyrylmonosulfide and 4-chloro-2-aminophenyl-4-antipyrylmonosulfide from orthonitrophenyl-4-antipyrylmonosulfide and 4-chloro-2-nitrophenyl-4-antipyrylmonosulfide, respectively.

Orthonitrophenyl-4-antipyrylmonosulfide and 4-chloro-2-nitrophenyl-4-antipyrylmonosulfide are prepared in accordance with the procedure set forth in Example 1. Ten grams of each of the resulting nitro-containing compounds are suspended separately in 55 ml. of acetonitrile. Reduction of the nitro groups to amino groups is carried out by hydrogenating the nitro-containing compounds in the presence of a catalyst comprising 1.3 grams of 5% platinum sulfide ($PtS_2$) supported on a carbon base for 3 to 3½ hours at a temperature of 125° C. and at a pressure of 600 p.s.i.g. These conditions give an overall hydrogen gas absorption value of 90% (based upon a maximum of 100%).

Table II lists data for each of the products which were obtained by the reduction method detailed in Example 5.

TABLE II

| Example | Formula | Melting Point (° C.) | Theoretical S | Theoretical H | Theoretical N | Theoretical S | Analyzed C | Analyzed H | Analyzed N | Analyzed S |
|---|---|---|---|---|---|---|---|---|---|---|
| 5A | $C_{17}H_{17}N_3OS$ | 211 | 65.55 | 5.50 | | 10.29 | 64.62 | 5.02 | | 11.19 |
| 5B | $C_{17}H_{16}N_3OSCl$ | 240 | 59.05 | 4.67 | 12.15 | | 58.77 | 4.66 | 12.16 | |

The compound of Example 5A is orthoaminophenyl-4-antipyrylmonosulfide. The compound of Example 5B is 2′-chloro-4′-amino-4-antipyrylmonosulfide.

Having thus described my invention what I claim and desire to protect by Letters Patent is:

1. A composition of matter having the structural formula

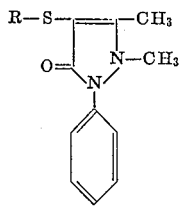

2. The composition of matter as defined in claim 1 in which R has the structural formula

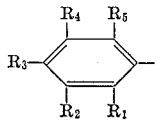

in which $R_1$ through $R_5$ are hydrogen, lower alkyl, halogen, not more than 2 nitro or not more than 2 amino groups.

3. The composition of matter as defined in claim 1 in which R is pentachlorophenyl.

4. The composition of matter as defined in claim 1 in which R is orthonitrophenyl.

5. The composition of matter as defined in claim 1 in which R is 2,4,6-trimethylphenyl.

6. The composition of matter as defined in claim 1 in which R is aminophenyl.

7. The composition of matter as defined in claim 1 in which R is unsubstituted or halogen substituted lower alkyl.

8. The composition of matter as defined in claim 7 in which R is isopropyl.

9. The composition of matter as defined in claim 7 in which R is trichloromethyl.

10. The process for making the composition of matter as defined in claim 1 comprising reacting a sulfenyl halide compound having the structural formula R—S—X in which R is phenyl, lower alkyl substituted phenyl, halo substituted phenyl, nitro substituted phenyl, halo nitro substituted phenyl, amino substituted phenyl, lower alkyl, or halo substituted lower alkyl, and X is chlorine, bromine or iodine, with 1-phenyl-2,3-dimethyl-3-pyrazolin-5-one at a molar reactant ratio of 1 to .75 in a polar solvent, precipitating and separating said composition of matter from said solvent.

11. The process as defined in claim 10 in which the polar solvent is ethylene dichloride, carbon disulfide, acetonitrile, chloroform or dry acetic acid.

12. A saturated halo intermediate adduct having the structural formula

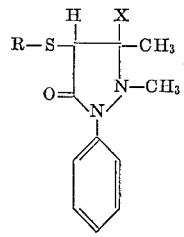

wherein R is phenyl, lower alkyl substituted phenyl, halo substituted phenyl, nitro substituted phenyl, halo-nitro substituted phenyl, amino substituted phenyl, lower alkyl, or halo substituted lower alkyl and wherein X is chloro, bromo, or iodo.

13. A process for the preparation of a composition as defined in claim 1, in which R is an amino phenyl group comprising mixing nitro-benzene sulfenyl chloride with 1-phenyl-2:3-dimethyl-3-pyrazolin-5-one in a polar solvent to form a nitrophenyl-4-antipyrylmonosulfide reaction product isolating said reaction product from said polar solvent, and contacting said reaction product with hydrogen in the presence of a platinum sulfide catalyst on a carbon support at a temperature between about 125–130° C., at a pressure of 520–650 p.s.i.g. thereby reducing the nitro group in the nitrophenyl-4-antipyrylmonosulfide to an amino group.

References Cited

UNITED STATES PATENTS 3,336,386   8/1967   Dovell et al. _____ 260—576

OTHER REFERENCES

Chem. Abst. Fourth Decennial Index vols. 31–40, Subjects Proteus-Z, pp. 8390–91, (1937–46), QDI. A51.

Chem. Abst., vol. 61, Subject Index (J–2), p 2224S (1964), QDI. A51.

Gundermann et al., Chem. Ber., vol. 91, p. 1332 relied on (1958), QDI. D4.

JOHN D. RANDOLPH, Primary Examiner

NATALIE TROUSOF, Assistant Examiner

U.S. Cl. X.R.

260—543, 999